(12) United States Patent
Mao et al.

(10) Patent No.: US 10,747,072 B2
(45) Date of Patent: Aug. 18, 2020

(54) CONDUCTIVE AGENT AND MODULE BONDING METHOD

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Qining Mao, Beijing (CN); Jian Xu, Beijing (CN); Yang Wang, Beijing (CN); Chao Xu, Beijing (CN); Changqing Huang, Beijing (CN); Zhanghai Hou, Beijing (CN); Pengcheng Niu, Beijing (CN); Peng Liu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 52 days.

(21) Appl. No.: 16/108,760

(22) Filed: Aug. 22, 2018

(65) Prior Publication Data

US 2019/0219851 A1    Jul. 18, 2019

(30) Foreign Application Priority Data

Jan. 18, 2018    (CN) .......................... 2018 1 0050754

(51) Int. Cl.
*G02F 1/1345*    (2006.01)
*C09J 4/06*    (2006.01)
(Continued)

(52) U.S. Cl.
CPC .............. *G02F 1/1345* (2013.01); *C09J 4/00* (2013.01); *C09J 4/06* (2013.01); *G02F 1/1339* (2013.01)

(58) Field of Classification Search
CPC .... H01R 4/04; H01B 1/22; H01B 1/20; G02F 1/1345; C09J 4/00; B82Y 40/00
(Continued)

(56) References Cited

U.S. PATENT DOCUMENTS

2015/0240130 A1* 8/2015 Liang .................... C09J 7/20
                                                    428/206
2016/0149366 A1* 5/2016 Akutsu ................ C09J 7/20
                                                    156/302

(Continued)

FOREIGN PATENT DOCUMENTS

CN    101278027 A    10/2008
CN    104650789 A    5/2015
CN    105493204 A    4/2016

OTHER PUBLICATIONS

First Office Action in CN Appl. No. 201810050754.6, dated Jul. 3, 2019.

*Primary Examiner* — Tri V Nguyen
(74) *Attorney, Agent, or Firm* — Dinsmore & Shohl LLP

(57) ABSTRACT

The present disclosure provides a conductive agent and a module bonding method. In the method, a conductive agent is sprayed to a bonding region. The conductive agent comprising a liquid ultraviolet curable adhesive and conductive particles dispersed in the ultraviolet curable adhesive. A module layer is pre-pressed onto the bonding region with the conductive agent between the module layer and the bonding region. The conductive agent is cured by irradiating the conductive agent with ultraviolet rays and pressurizing the
(Continued)

conductive agent, so that the module layer is electrically connected and bonded to the bonding region.

8 Claims, 2 Drawing Sheets

(51) Int. Cl.
    *G02F 1/1339*    (2006.01)
    *C09J 4/00*    (2006.01)
    *H01B 1/20*    (2006.01)

(58) Field of Classification Search
    USPC .................................... 252/500, 510, 514
    See application file for complete search history.

(56) References Cited

U.S. PATENT DOCUMENTS

2017/0107406 A1*   4/2017  Araki ..................... C09J 7/00
2017/0271299 A1*   9/2017  Li ........................ H01L 27/124

\* cited by examiner

CONDUCTIVE AGENT AND MODULE BONDING METHOD

CROSS-REFERENCE TO RELATED APPLICATIONS

The present application claims priority to China Patent Application No. 201810050754.6, filed on Jan. 18, 2018, the disclosure of which is incorporated by reference herein in its entirety.

TECHNICAL FIELD

The present disclosure relates to a conductive agent and a module bonding method.

BACKGROUND

With the development of TFT-LCD (Thin Film Transistor-Liquid Crystal Display), the thickness of display panels is getting thinner and thinner, the resolution is getting higher and higher, and the product quality and the capacity requirement are getting higher and higher. ACF (Anisotropic Conductive Film) plays an important role in the bonding process of modules.

SUMMARY

According to an aspect of embodiments of the present disclosure, there is provided a conductive agent, the conductive agent comprising: a liquid ultraviolet curable adhesive and conductive particles dispersed in the ultraviolet curable adhesive.

In some embodiments, each of the conductive particles comprises: a plastic ball, a nickel layer wrapped on the surface of the plastic ball, and a gold layer wrapped on the surface of the nickel layer.

In some embodiments, a diameter of each of the conductive particles ranges from 3 microns to 5 microns.

In some embodiments, a distribution density of the conductive particles in the ultraviolet curable adhesive ranges from 3,000 particles per cubic millimeter (particles/mm$^3$) to 20,000 particles/mm$^3$.

According to another aspect of embodiments of the present disclosure, there is provided a module bonding method, the module bonding method comprising: spraying a conductive agent to a bonding region, the conductive agent comprising a liquid ultraviolet curable adhesive and conductive particles dispersed in the ultraviolet curable adhesive; pre-pressing a module layer onto the bonding region with the conductive agent between the module layer and the bonding region; curing the conductive agent by irradiating the conductive agent with ultraviolet rays and pressurizing the conductive agent.

In some embodiments, each of the conductive particles comprises: a plastic ball, a nickel layer wrapped on the surface of the plastic ball, and a gold layer wrapped on the surface of the nickel layer.

In some embodiments, a diameter of each of the conductive particles ranges from 3 microns to 5 microns.

In some embodiments, a distribution density of the conductive particles in the ultraviolet curable adhesive ranges from 3,000 particles/mm$^3$ to 20,000 particles/mm$^3$.

In some embodiments, a wavelength of the ultraviolet rays ranges from 300 nm to 400 nm; the conductive agent is irradiated with the ultraviolet rays for a duration greater than or equal to 4 seconds.

In some embodiments, a pressure for pressurizing the conductive agent ranges from 2 megapascal (Mpa) to 5 MPa.

In some embodiments, before pre-pressing the module layer onto the bonding region, the method further comprises: pre-curing the conductive agent by irradiating the conductive agent with the ultraviolet rays.

In some embodiments, the conductive agent is irradiated with the ultraviolet rays for a duration of 0.2 second to 1 second in the process of pre-curing the conductive agent.

In some embodiments, the conductive agent is further subjected to heat treatment at a temperature of 60° C. to 80° C. in the process of curing the conductive agent.

Other features of the present disclosure and the advantages thereof will become explicit by the following detailed descriptions of the exemplary embodiments of the present disclosure with reference to the accompanying drawings.

BRIEF DESCRIPTION OF THE DRAWINGS

The accompanying drawings, which constitute a part of the specification, describe the embodiments of the present disclosure and, together with the description, serve to explain the principles of the present disclosure.

The present disclosure will be more clearly understood from the following detailed description with reference to the accompanying drawings, in which.

Figure 1:
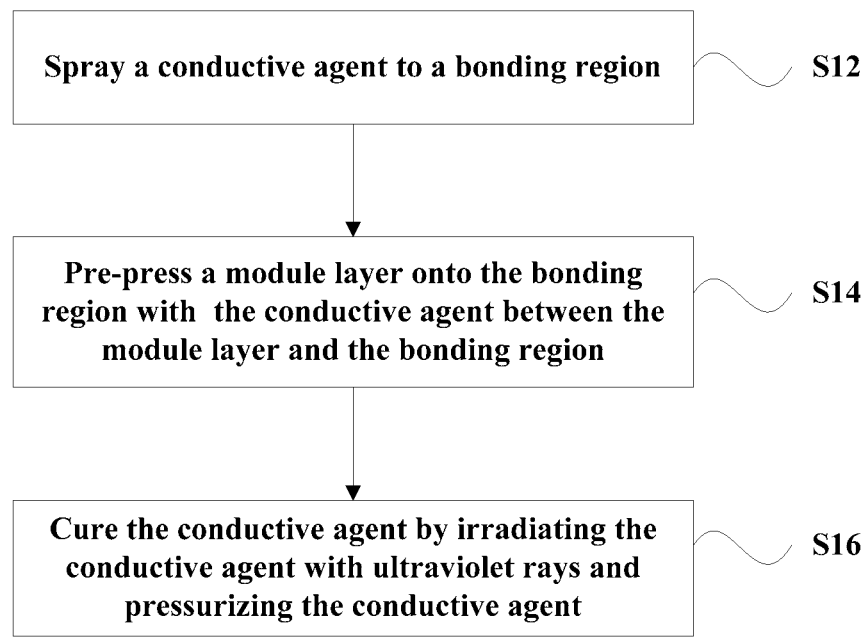
FIG. 1 is a flowchart illustrating a module bonding method according to some embodiments of the present disclosure.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "contain" or variants thereof means that the element before the word covers the element(s) listed after the word without excluding the possibility of also covering other elements. The terms "up", "down", "left", "right" or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or the second component, or there may be no intervening component.

Unless otherwise defined, all terms (comprising technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

In module bonding processes known to the inventors of the present disclosure, it is necessary to mount an ACF web to the device in a prescribed path of the device. ACF is attached to a designated bonding region of a panel by pressurizing and heating the ACF. Then, a module layer such as a COF (Chip On Film) or IC (Integrated Circuit) layer is pre-pressed onto the panel. The ACF is then sufficiently reacted under conditions such as high temperature, high pressure, etc., so that the module layer is electrically connected and adhered to the panel.

The inventors of the present disclosure have found the following problems existed in the above known module bonding processes: the ACF currently used is packaged in webs, complicated equipments are required in its production process, and in order to achieve the required bonding state of products, high temperature, high pressure and other conditions are required in the bonding process.

(1) The current ACF must be stored at low temperature (below zero). The life of ACF is very short at room temperature, in general, less than one week, for example.

(2) ACF is packaged in the form of webs. Since it is stored at low temperature, when it is used at room temperature, stress is generated, which may cause the ACF to be unwound, so that the web cannot be too large (for example, 100 m to 200 m). Thus, it is necessary to change raw materials frequently in the process of production, thereby affecting the utilization rate of equipment.

(3) ACF can react only at a high temperature (for example, above 140° C.), however, the material of the COF, IC or other module layer will expand at such a high temperature, resulting in unstable bonding accuracy, uneven brightness of COG (Chip On Glass) and other undesirable phenomena.

(4) The ACF attaching unit of the current devices has a complicated structure. In order to ensure the production tact time (referred to as TT), additional equipment is required.

In view of this, the present disclosure has proposed a conductive agent also called Anisotropic Conductive Liquid (ACL) and a module bonding method based on the conductive agent. The conductive agent and the module bonding method according to some embodiments of the present disclosure will be described in detail below with reference to the accompanying drawings.

In embodiments of the present disclosure, a conductive agent is provided. The conductive agent comprises: a ultraviolet (UV) curable adhesive (referred to as UV glue) which is liquid at room temperature and conductive particles dispersed in the ultraviolet curable adhesive.

Figure 5:
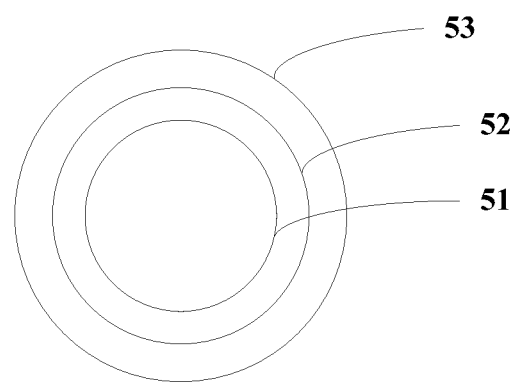
FIG. 5 is a structural diagram showing the conductive particles in the conductive agent according to some embodiments of the present disclosure.

FIG. 5 is a structural diagram showing the conductive particles in the conductive agent according to some embodiments of the present disclosure. In some embodiments, as shown in FIG. 5, each of the conductive particles comprises: a plastic ball 51, a nickel layer 52 wrapped on the surface of the plastic ball 51, and a gold layer 53 wrapped on the surface of the nickel layer 52. The plastic ball of the conductive particle has elasticity, with its upper and lower ends being in close contact with other structures respectively to prevent the peeling problem due to thermal expansion or contraction. The nickel layer is attached to the plastic ball to facilitate the attachment of the gold layer in the following steps. The gold layer has good conductivity, good ductility and good stability, so that the gold layer is not easy to react with other materials.

In some embodiments, a diameter of each of the conductive particles ranges from 3 microns to 5 microns. For example, the diameter of the conductive particle is 3.5 µm, 4 µm or 4.5 µm or the like.

In some embodiments, a distribution density of the conductive particles in the ultraviolet curable adhesive ranges from 3,000 particles/mm$^3$ to 20,000 particles/mm$^3$. For example, the distribution density of the conductive particles in the ultraviolet curable adhesive is 5,000 particles/mm$^3$, 10,000 particles/mm$^3$, or 15,000 particles/mm$^3$. For example, the ultraviolet curable adhesive and the conductive particles of the above-described distribution density are mixed and stirred to form a desired conductive agent.

Figure 2:
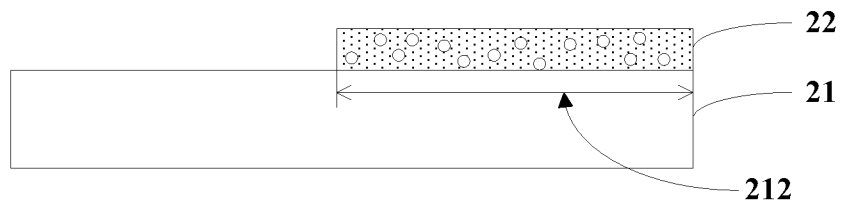
FIG. 2 is a cross-sectional view showing the structure of one stage of the module bonding method according to some embodiments of the present disclosure.
Figure 3:
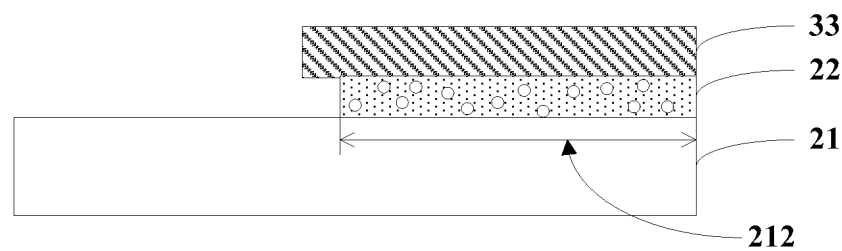
FIG. 3 is a cross-sectional view showing the structure of one stage of the module bonding method according to some embodiments of the present disclosure.
Figure 4:
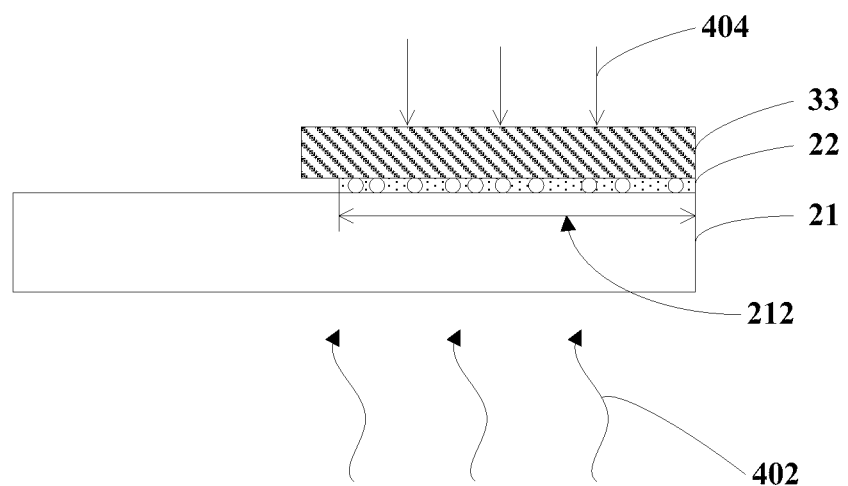
FIG. 4 is a cross-sectional view showing the structure of one stage of the module bonding method according to some embodiments of the present disclosure.

FIG. 1 is a flowchart illustrating a module bonding method according to some embodiments of the present disclosure. FIG. 2 to FIG. 4 are cross-sectional views showing the structures of some stages of the module bonding method according to some embodiments of the present disclosure. The module bonding method according to some embodiments of the present disclosure will be described in detail below with reference to FIG. 1 and FIG. 2 to FIG. 4.

As shown in FIG. 1, in step S12, spray a conductive agent to a bonding region.

The conductive agent comprises a liquid ultraviolet curable adhesive and conductive particles dispersed in the ultraviolet curable adhesive.

FIG. 2 is a cross-sectional view showing the structure obtained in step S12 of the module bonding method according to some embodiments of the present disclosure. As shown in FIG. 2, the conductive agent 22 at room temperature is sprayed onto the bonding region 212 of a panel 21, for example, by a spraying device (such as, a glue valve).

Returning to FIG. 1, in step S14, pre-press a module layer onto the bonding region with the conductive agent between the module layer and the bonding region.

FIG. 3 is a cross-sectional view showing the structure obtained in step S14 of the module bonding method according to some embodiments of the present disclosure. As shown in FIG. 3, the module layer 33 is pre-pressed onto the bonding region 212 of the panel 21 with the conductive agent 22 between the module layer 33 and the bonding region 212. For example, the module layer 33 comprises a COF layer or an IC layer or the like. Through this step, the purpose of pre-pressing a module layer such as a COF or IC layer onto the bonding area of the panel is achieved.

Returning to FIG. 1, in step S16, cure the conductive agent by irradiating the conductive agent with ultraviolet rays and pressurizing the conductive agent.

FIG. 4 is a cross-sectional view showing the structure obtained in step S16 of the module bonding method according to some embodiments of the present disclosure. As shown in FIG. 4, the conductive agent 22 is cured by irradiating the conductive agent 22 with ultraviolet rays 402 and performing a pressurization operation 404 on the conductive agent 22, thereby the module layer 33 is connected and bounded to the bonding layer 212 of the panel 21. For example, an ultraviolet light source is mounted on a mechanism for supporting the panel (which is referred to as a Backup mechanism) to emit ultraviolet rays, and a pressure is applied to the module layer to apply a certain pressure to the conductive agent, so that the conductive agent sufficiently reacts to be cured. In this way, the module layer is connected and adhered to the bonding region of the panel.

In this step, the panel is typically a transparent material layer, so ultraviolet rays are emitted upward from the underside of the panel (as shown in FIG. 4), and irradiate the conductive agent through the panel. In the process of pressurizing the conductive agent, the conductive particles in the conductive agent are pressed into a layer of conductive particles. The upper and lower ends of the conductive particles respectively contact the module layer and the bonding region of the panel, so that the module layer is connected to the bonding region of the panel. Since the conductive particles are surrounded by the ultraviolet curing adhesive, the conductive particles are insulated from each other. The conductive agent exhibits anisotropy. In this way, both of the bonding of the module layer to the panel and the conduction between the module layer and the panel are achieved.

In some embodiments, a wavelength of the ultraviolet rays ranges from 300 nm to 400 nm. For example, the wavelength of the ultraviolet rays is 365 nm.

In some embodiments, the conductive agent is irradiated with the ultraviolet rays for a duration greater than or equal to 4 seconds in the process of curing the conductive agent. For example, the duration in which the conductive agent is irradiated with the ultraviolet rays is 5 seconds, 6 seconds, or 8 seconds, etc.

In some embodiments, a pressure for pressurizing the conductive agent ranges from 2 MPa to 5 MPa in the process of curing the conductive agent. For example, the pressure for pressurizing the conductive agent is 3 MPa or 4 MPa or the like.

So far, a module bonding method according to some embodiments of the present disclosure is provided. In the module bonding method, a conductive agent that is liquid at room temperature is sprayed to the bonding region. A module layer is pre-pressed onto the bonding region with the conductive agent between the module layer and the bonding region. The conductive agent is cured by irradiating the conductive agent with ultraviolet rays and pressurizing the conductive agent, so that the module layer is electrically connected and bonded to the bonding region. Since the conductive agent is cured by ultraviolet rays, the temperature during the production process is relatively low (for example, it is room temperature), thereby the temperature during the bonding process is lowered, so that the module layer is prevented from being affected by the amount of material expansion during the bonding process.

Furthermore, the conductive agent is liquid at room temperature, so it is more stable to spray with glue valve. The structure of the glue valve is simple. And through the spraying method, the coating efficiency is high. Moreover, the conductive agent is stored in a bucket, resulting in less replacement of raw materials in the case of mass production, and thus the equipment utilization rate is improved. In addition, the conductive agent is stored at room temperature and has a long storage time.

In some embodiments, before pre-pressing the module layer onto the bonding region, the module bonding method further comprises: pre-curing the conductive agent by irradiating the conductive agent with the ultraviolet rays. For example, the conductive agent is irradiated with the ultraviolet rays for a duration of 0.2 second to 1 second in the process of pre-curing the conductive agent. For example, the irradiation duration is 0.5 seconds or 0.8 seconds or the like. The pre-curing treatment makes the conductive agent flow less easily, thereby making the conductive agent more uniform.

In some embodiments, the conductive agent is further subjected to heat treatment at a temperature of 60° C. to 80° C. (for example, 70° C.) in the process of curing the conductive agent. In this embodiment, the molecules of the conductive agent start to react at a temperature of 60° C. to 80° C., so that the viscosity of the conductive agent increases. After the conductive agent is irradiated with ultraviolet rays, the conductive agent rapidly solidifies into a solid state to achieve a bonding effect. The heat treatment is more favorable to the curing of the conductive agent and is beneficial to the bonding of the module layer and the bonding region. Moreover, the temperature of the heat treatment is relatively low (this temperature is lower than the reaction temperature of the current ACF bonding technique, for example, 140° C.), so that the module layer is prevented from being affected by the amount of material expansion during the bonding process.

In the module bonding method according to other embodiments of the present disclosure, a conductive agent that is liquid at room temperature is sprayed to the bonding region. The conductive agent is irradiated with ultraviolet rays to perform a pre-curing process. A module layer is pre-pressed onto the bonding region with the conductive agent between the module layer and the bonding region. The conductive agent is irradiated with ultraviolet rays and is pressurized, and a heat treatment is performed to the conductive agent at a temperature of 60° C. to 80° C. to cure the conductive agent, so that the module layer is electrically connected and bonded to the bonding region. Through the module bonding method of this embodiment, the bonding temperature is lowered, the bonding process is simplified, the product defect rate is reduced, and the equipment utilization rate is improved.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A module bonding method, comprising:
spraying a conductive agent to a bonding region, the conductive agent comprising a liquid ultraviolet curable adhesive and conductive particles dispersed in the liquid ultraviolet curable adhesive;
pre-pressing a module layer onto the bonding region with the conductive agent between the module layer and the bonding region; and
curing the conductive agent by irradiating the conductive agent with ultraviolet rays and pressurizing the conductive agent, wherein the conductive agent is further subjected to heat treatment consisting of heating at a temperature of 60° C. to 80° C. in the curing of the conductive agent.

2. The module bonding method according to claim 1, wherein
each of the conductive particles comprises: a plastic ball, a nickel layer wrapped on a surface of the plastic ball, and a gold layer wrapped on the surface of the nickel layer.

3. The module bonding method according to claim 1, wherein
a diameter of each of the conductive particles ranges from 3 microns to 5 microns.

4. The module bonding method according to claim 1, wherein
a distribution density of the conductive particles in the liquid ultraviolet curable adhesive ranges from 3,000 particles per cubic millimeter (particles/mm$^3$) to 20,000 particles/mm$^3$.

5. The module bonding method according to claim 1, wherein
a wavelength of the ultraviolet rays ranges from 300 nm to 400 nm;
the conductive agent is irradiated with the ultraviolet rays for a duration greater than or equal to 4 seconds.

6. The module bonding method according to claim 1, wherein
a pressure for pressurizing the conductive agent ranges from 2 megapascal (MPa) to 5 MPa.

7. The module bonding method according to claim 1, wherein before pre-pressing the module layer onto the bonding region, the module bonding method further comprises:
pre-curing the conductive agent by irradiating the conductive agent with the ultraviolet rays.

8. The module bonding method according to claim 7, wherein
the conductive agent is irradiated with the ultraviolet rays for a duration of 0.2 second to 1 second in the pre-curing of the conductive agent.

* * * * *